(12) United States Patent
Procopio

(10) Patent No.: US 6,952,406 B2
(45) Date of Patent: Oct. 4, 2005

(54) METHOD AND APPARATUS FOR REPORTING TOTAL CALL QUALITY

(75) Inventor: Pete Joseph Procopio, Apex, NC (US)

(73) Assignee: Acterna L.L.C., Germantown, MD (US)

( * ) Notice: Subject to any disclaimer, the term of this patent is extended or adjusted under 35 U.S.C. 154(b) by 883 days.

(21) Appl. No.: 09/899,486

(22) Filed: Jul. 5, 2001

(65) Prior Publication Data

US 2003/0007458 A1 Jan. 9, 2003

(51) Int. Cl.[7] .............................................. H04L 12/26
(52) U.S. Cl. ..................................... 370/252; 709/224
(58) Field of Search ................................. 370/252–253, 370/235, 238, 395.21; 709/223–225, 232–235

(56) References Cited

U.S. PATENT DOCUMENTS 5,883,819 A * 3/1999 Abu-Amara et al. ........... 716/1
6,421,350 B1 * 7/2002 Szurkowski et al. ........ 370/419
6,515,964 B1 * 2/2003 Cheung et al. ............. 370/230
6,757,256 B1 * 6/2004 Anandakumar et al. .... 370/252
2002/0105909 A1 * 8/2002 Flanagan et al. ........... 370/230

* cited by examiner

*Primary Examiner*—Chi Pham
*Assistant Examiner*—Thai Hoang
(74) *Attorney, Agent, or Firm*—Moore & Van Allen PLLC; Dominic J. Chiantera

(57) ABSTRACT

Method and Apparatus for Reporting Total Call Quality. The present invention provides the capability to report the quality of an entire call to an operator. In one embodiment, the invention works by receiving message associated with the call, the messages including a set of call quality metrics. The invention then compares at least one of the call quality metrics to at least one of a set of associated thresholds, at intervals of time, for determining whether call quality is one of a set of call qualities for the designated time interval. Next, the invention determines at least one percentage of at least one call quality from the set of call qualities received for all of the time intervals for the call.

24 Claims, 13 Drawing Sheets

METHOD AND APPARATUS FOR REPORTING TOTAL CALL QUALITY

BACKGROUND

1. Field of the Invention

This invention relates to the field of devices for monitoring and analyzing networks. More particularly, this invention relates to devices for monitoring and analyzing the transmission quality of packet network telephony.

2. Description of the Problem

A current objective of telephony providers is to provide users with high-quality voice service through packet networks. Packet networks transmit communication in messages which are commonly known as packets. A packet is a message carrying data for communication between two network terminals, each having different IP addresses and port numbers. Packet networks carrying voice communications must be managed to ensure their performance quality.

Many voice communication and other real-time applications use the Real-time Transport Protocol (RTP) for the transmission of messages. RTP is described in Request for Comments (RFC): 1889 and 1890, which are each incorporated herein by reference. Real-time Control Protocol (RTCP), a subset of RTP and also described in RFC: 1889 and 1890, is a network packet that contains call quality metrics, providing information on the quality of a voice communication, or call, at that moment. The headers for these protocols include quality metrics containing current information on jitter, packet loss, and delay. RTCP provides feedback to an application about the quality of data distribution. Quality metrics are useful to the senders, the receivers and third-party monitors for the discovery of network problems. The sender can adjust its transmission based on the receiver report feedback. The receivers can determine whether a congestion is local, regional or global. Any type of network frame may carry quality metric.

These quality metrics are important to network administrators for the anticipation of performance changes and the diagnosis performance failures. Network administrators can use devices known as network analyzers to intercept messages containing quality metrics in order to assist in their monitoring and analysis of network performance. Network analyzers have historically tracked RTCP messages for VoIP signal traffic trends for the instantaneous reports of quality; however, network analyzers have not provided a way to provide the user information about the quality of a completed communication for the entire duration of the communication. Currently, RTCP only provides a means to determine quality of a communication at one moment in time. There is a need for a way to determine total call quality using the RTCP messages. The benefit of determining total call quality is that it gives the VoIP application the ability to provide enhanced and more accurate VoIP call quality calculations. This will allow network administrators to provide better voice and facsimile services to network users.

Furthermore, there is a need to provide call quality calculations in a way that operators in the data communications and telecommunications fields can both understand. Data communication operators are accustomed to jitter, packet loss, and delay information to help them determine network quality; therefore, the application of these statistics to call quality will make the information more useful and understandable to them. Telecommunications operators expect call quality to be determined by signal information. Call quality information should be provided to them in a way that is familiar to telecommunication operators.

SUMMARY

The present invention solves the above problem by providing the capability to report the total call quality of a network call. Because the invention is able to provide an operator with total call quality information, the operator is better able to manage voice and facsimile services to network users. In one embodiment, the invention works by receiving message associated with the call, the messages including a set of call quality metrics. The invention then compares at least one of the call quality metrics to at least one of a set of associated thresholds, at intervals of time, for determining whether call quality is one of a set of call qualities for the designated time interval. Next, the invention determines at least one percentage of at least one call quality from the set of call qualities received for all of the time intervals for the call.

According to another embodiment of the invention, the invention receives messages associated with a call, the messages including a set of call quality metrics. Next, the invention stores at least one quality metric of each message into an associated entry in a call list, the call list is a data structure including at least one set of entries. Each set of entries is associated with a particular call. The invention then compares at least one of the call quality metrics to at least one of a set of associated thresholds, at intervals of time, for determining whether call quality is one of a set of call qualities for the designated time interval. Next, the invention determines at least one percentage of at least one call quality from the set of call qualities received for all of the time intervals for the call. Finally, the invention displays the percentages to an operator. These percentages represent the total call quality for the call.

According to another embodiment of the invention, the invention is a computer readable memory system encoded with a call list, each entry in the call list comprising at least one call quality metric from an associated message. In another embodiment, each entry in the call list includes a call number for identifying an associated call from among a set of calls.

Many aspects of the invention are implemented by computer program code. The computer program code together with the hardware described herein provides the means to perform the functions of reporting total call quality. The computer program code can be stored independently from the computer system or transported over a network for shipping, back-up, or archival purposes. If the code is stored, storage media is used. The media can be magnetic such as diskette, tape, or fixed disk, or optical such as a CD-ROM.

These and other advantages of the present invention will become apparent to those skilled in the art upon a reading of the following specification of the invention and a study of the several figures of the drawings.

DETAILED DESCRIPTION

Figure 5:
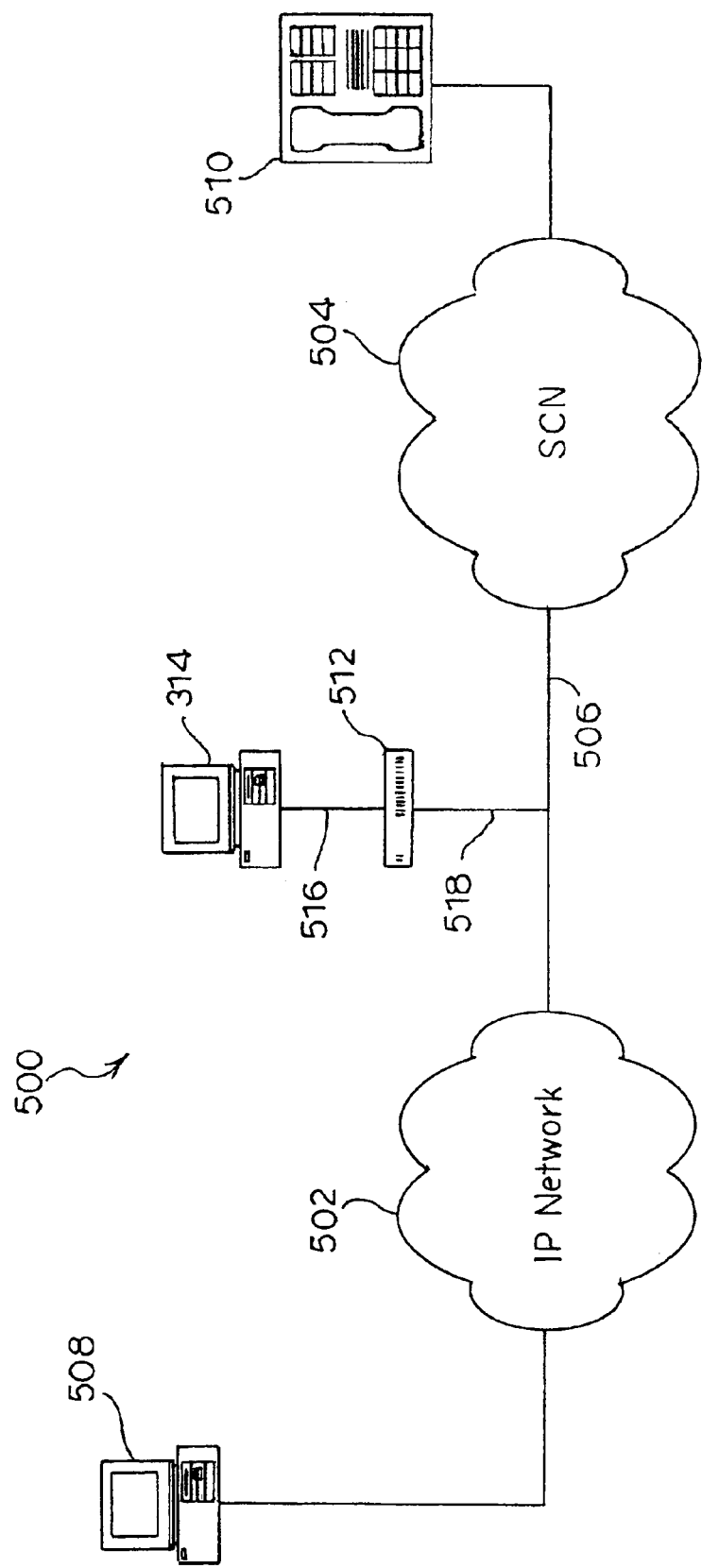
FIG. 5 is a figurative illustration of an IP network and a switched communication network for transmitting voice communication.

The present invention relates to a knowledge-based, expert analysis system for monitoring and analyzing packet network telephony. The present invention is a troubleshooting tool aimed at the analysis and resolution of packet network telephony problems by providing total quality reports based upon quality metrics retrieved from network frames. These total quality reports can be presented to the user through a graphical user interface (GUI), such as a screen display, or a computer printer. A packet switching network such as an IP network is an example of the operating environment for the present invention. Referring to FIG. 5, a figurative illustration of an IP network 502 and a switched communication network 504, connected by serial link communication medium 506, for transmitting voice communication from H.323 terminal 508 to a voice terminal 510 connected to the SCN 504. The H.323 terminal 508 is a terminal for providing voice communication and intended for connection to an IP network. The voice terminal 510 is a terminal, such as a known telephone, for providing voice communication through a SCN. The IP network 502 and switched communication network 504 may contain sub-networks, and is only intended in this description to illustrate a basic level of application.

A computer system, comprising a network analyzer 512 and a host computer 314, as known in the art, is provided having the necessary hardware and software to capture, analyze, and monitor network frames. In particular, the computer system is provided as an example of a device comprising the present invention. The network analyzer 512 is provided as an example of a network device having the functions of encoding network frames, decoding network frames, and emulating network traffic. The network analyzer 512 and host computer 314 is provided as an example of a device requiring the functions of providing a means of presenting network frame data to the host computer 314. The network traffic on the serial link communication medium 506 is in framed, serial digital bit format, a network frame. In practice, the host computer 314 may be local to, or remote from, the network. For local use, as depicted in FIG. 5, the host computer 314 is connected through its port and cable 516 to a network analyzer 512. The network analyzer 512 is in turn connected through a network connection 518, or lines, to the serial link communication medium 506. The host computer 314 may be utilized to facilitate operator interface. A network analyzer's monitoring, diagnostic, and problem resolution activities are under software control. Such software control is exercised by a main central processing unit (CPU), which is usually one or more microprocessors contained within the network analyzer 512 itself.

Figure 3:
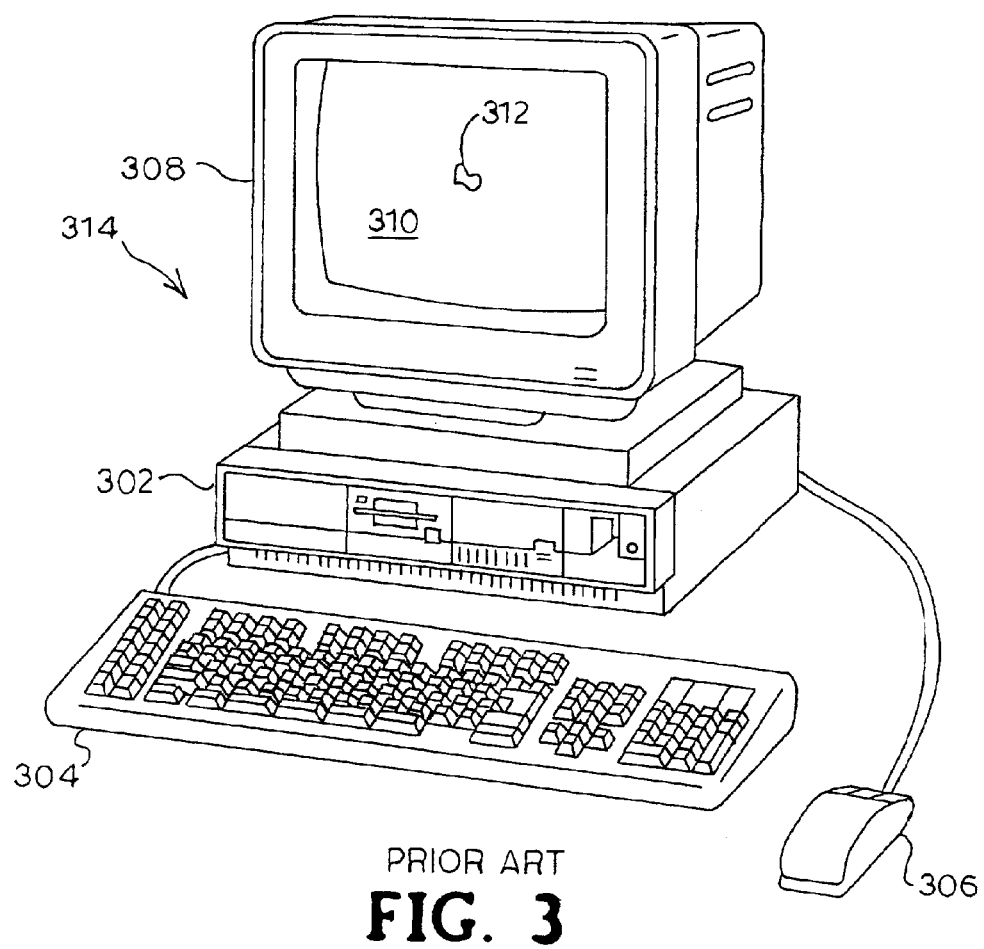
FIG. 3 illustrates a host computer comprising a system unit, a keyboard, a mouse, and a display.

Referring now to FIG. 3, the host computer 314 of FIG. 5, comprising a system unit 302, a keyboard 304, a mouse 306, and a display 308, is illustrated in detail. The screen 310 of the display 308 is used to present the visual changes to the data object. The GUI supported by the operating system allows the user to use a point and shoot method of input by moving the pointer 312 at a particular location in the GUI displayed on the screen 310 and press one of the mouse buttons to perform a user command or selection.

Figure 4A:
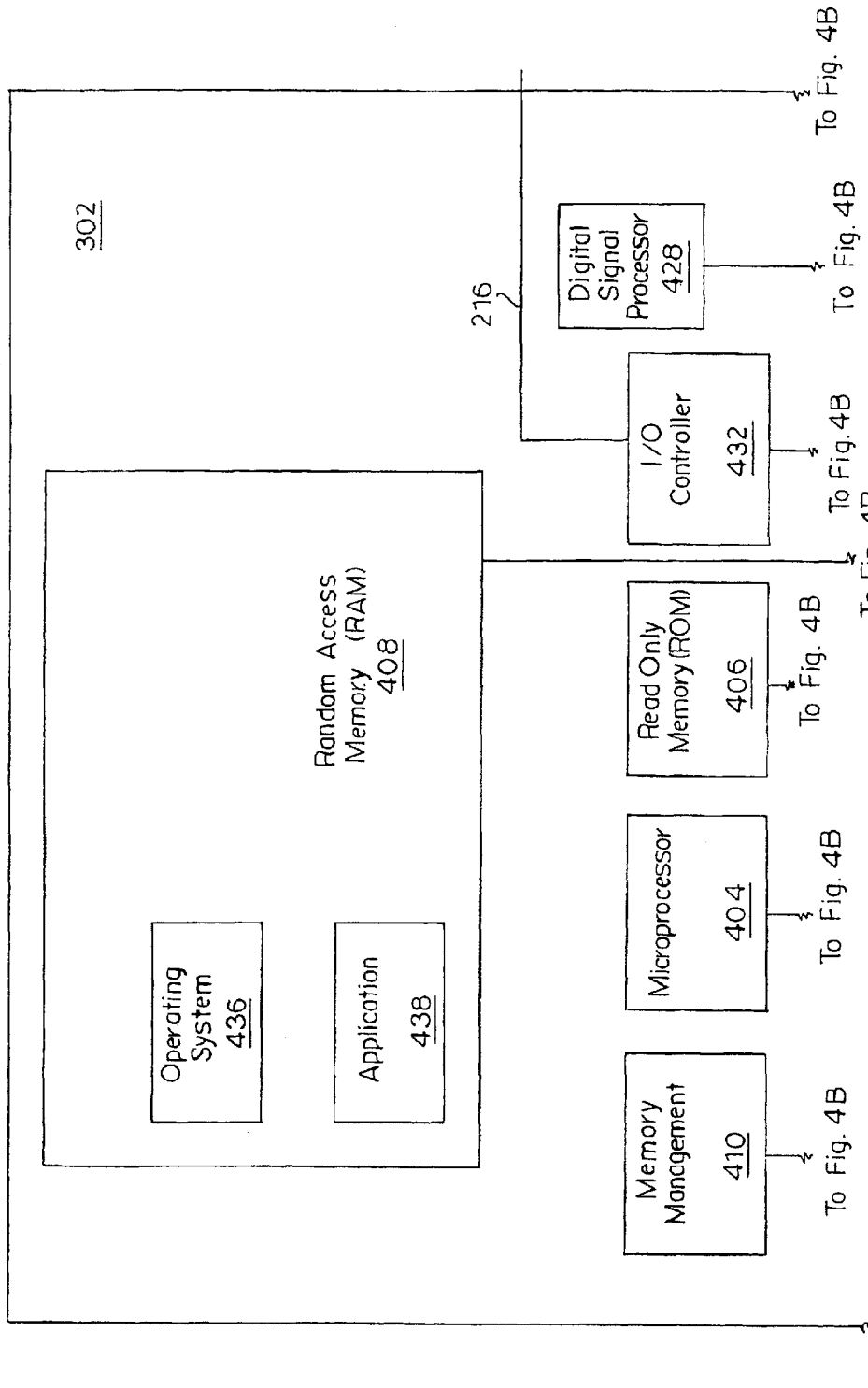
FIGS. 4A and 4B illustrate a block diagram of the components of a host computer.
Figure 4B:
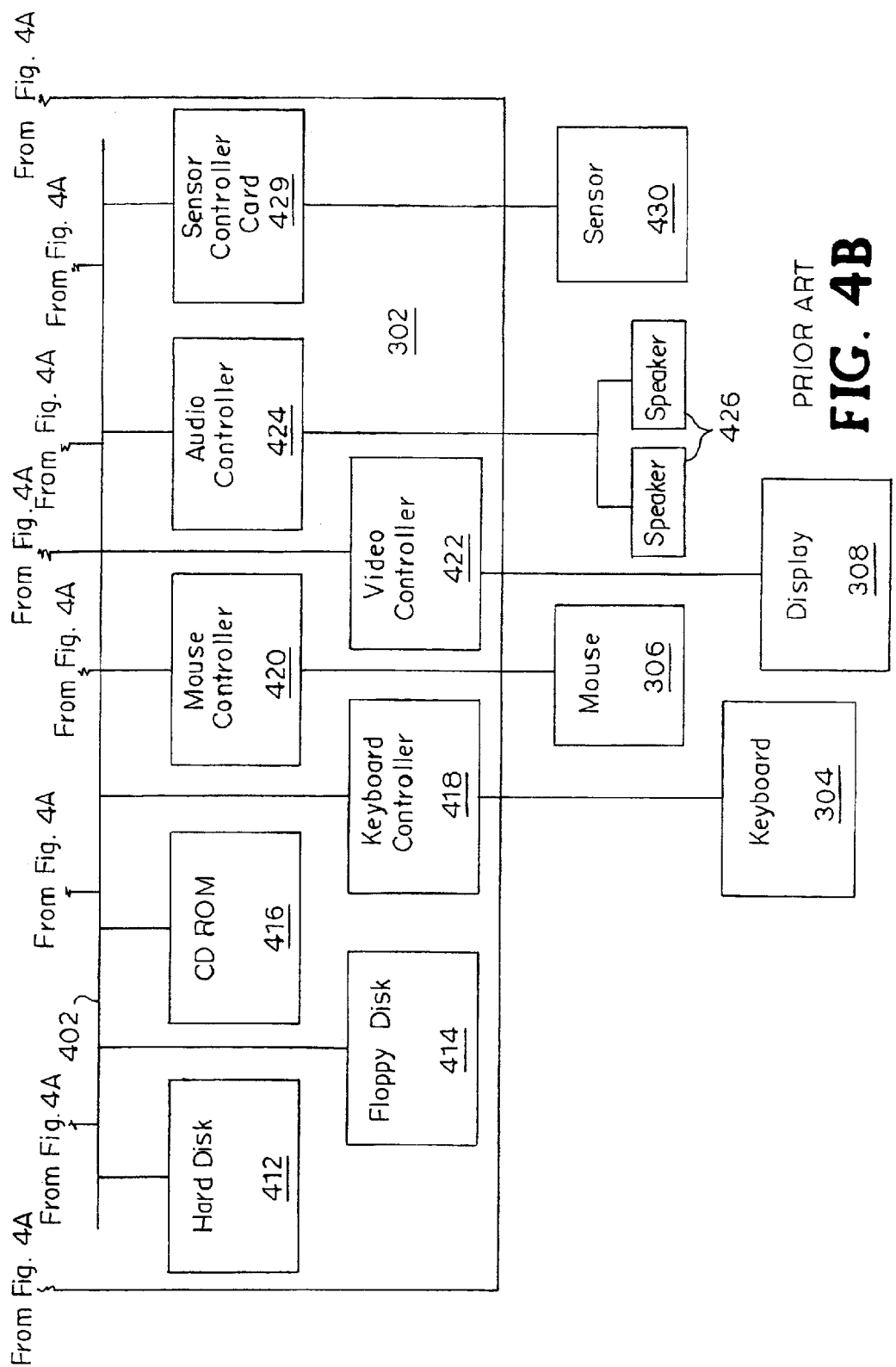

Referring now to FIGS. 4A and 4B, a block diagram of the components of the host computer 414 shown in FIG. 3 is illustrated. The system unit 302 includes a bus or a plurality of buses 402 to which various components are coupled and by which communication between the various components is accomplished. The processor 404 is connected to the bus 402 and is supported by read only memory (ROM) 406 and random access memory (RAM) 408 also connected to the bus 402. The ROM 406 contains among other software code the Basic Input-Output system (BIOS) which controls basic hardware operations such as the interaction and the disk drives and the keyboard. The RAM 408 is the main memory into which the operating system and application programs are loaded. The memory management chip 410 is connected to the bus 402 and controls direct memory access operations including, passing data between the RAM 408 and hard disk drive 412 and floppy disk drive 414. The CD ROM 416 also coupled to the bus 402 is used to store a large amount of data, e.g., a multimedia program or presentation.

Also, connected to this bus 402 are various I/O controllers: the keyboard controller 418, the mouse controller 420, the video controller 422, and the audio controller 424. The keyboard controller 418 provides the hardware interface for the keyboard 304, the mouse controller 420 provides the hardware interface for the mouse 306, the video controller 422 provides the hardware interface for the display 308, and the audio controller 424 provides the hardware interface for the speakers 426. Also coupled to the bus 402 is digital signal processor 428 which is incorporated into the audio controller 424. A sensor controller card 429 is coupled to the bus 402 and converts the electrical signals from a sensor 430 into messages usable by the host computer 314. An I/O controller 432 enables communication over the cable 418 to the network analyzer 412.

The RAM 408 includes an operating system 436 and application program 438. The application program 438 included on the RAM 408 is for running the operation of the present invention. The operating system 436 controls the GUI presented by the host computer 314 on the display 308 and the access of other application programs to user input from the input devices. Some operating systems may operate in cooperation with a presentation manager to manage the GUI. In the GUI, the objects, e.g., the operating system, operating system utilities, applications and data files are represented by icons or windows on the display 308. The GUI may be used to present quality reports to the operator. The user may move the cursor or pointer to an icon position to open or otherwise manipulate the object.

In this embodiment for reporting call quality, two automatic processes are running simultaneously: network frame extraction/decoding and the determination of current instantaneous call quality for the calls in a call list. These automatic processes are run by the host computer 314 and network analyzer 512. An operator may request running two other processes for viewing instantaneous call quality or total call quality reports.

For the automatic processes, the network analyzer 512 continuously receives network frames from the network via the network connection 518. Simultaneously, the network analyzer 512 processes the received network frames by extracting certain call quality metric fields from the network frames containing RTP and RTCP headers. Alternatively, the network analyzer 512 gathers different control protocol messages or all network frames. The network analyzer 512 then stores the extracted call quality metrics in a call list. The call list is a linked list stored in a memory device such as memory storage on the network device or computer-readable memory.

Figure 6:
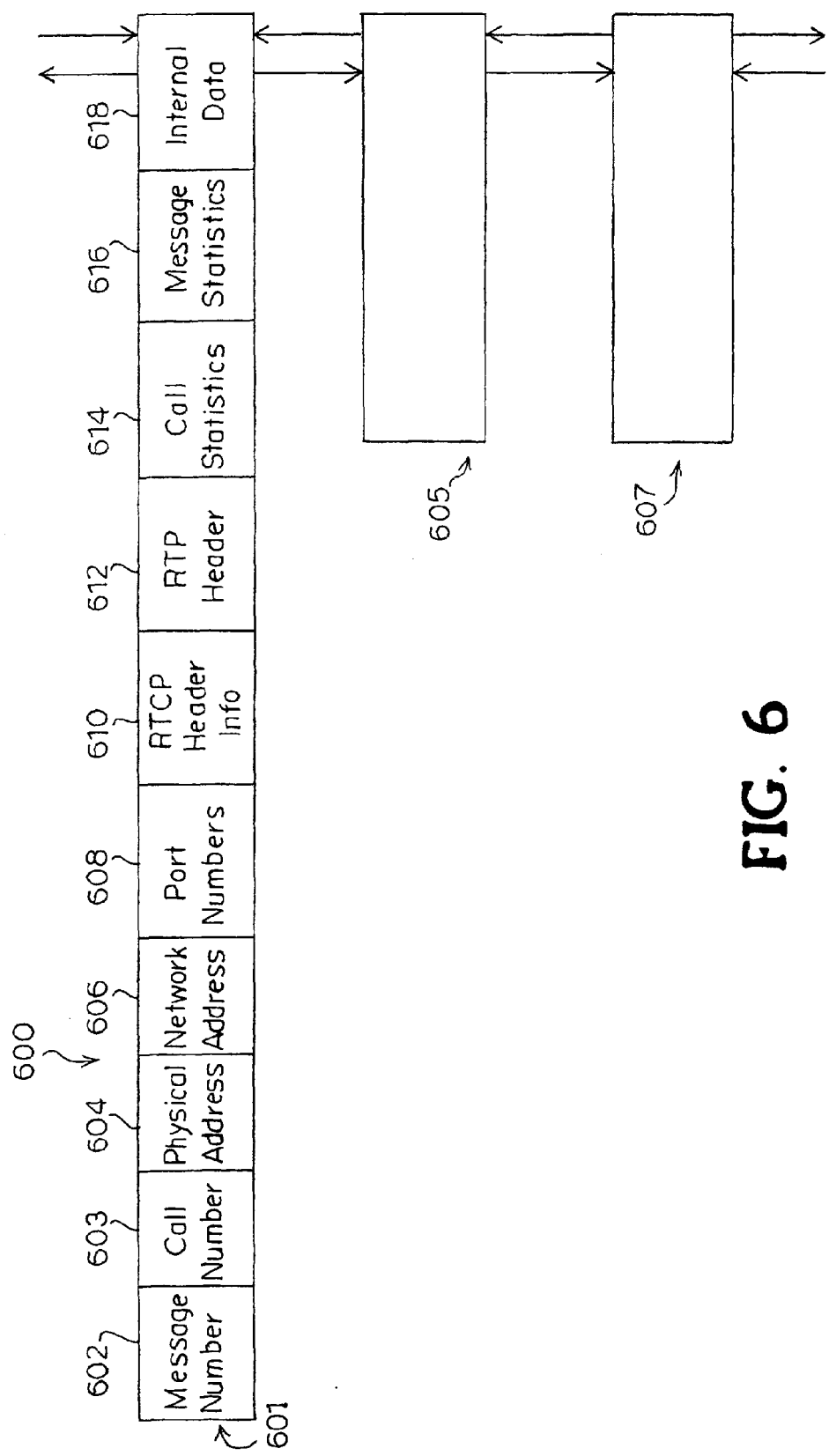
FIG. 6 is a figurative illustration of a call list.

Referring now to FIG. 6, a call list 600 is illustrated. The call list 600 is a linked list of entries which contain information for each call being tracked, some of which are illustrated by reference numbers 601, 605, and 607. Entries are grouped in the call list by the call in which they are associated and by the order received. Call number 603 holds data indicating the call with which the entry is associated. The message number 602 contains data ordering the entry in the order the message was received by the network analyzer 512. Physical address 604, network address 606, and port numbers 608 contain data indicating the network device that sent the message. Internal data 618 includes pointers to the previous and next entry in the call list for the manipulation of the call list. RTCP header 610 and RTP header 612 contain quality metrics that have been extracted from the message and subsequently stored in the call list. Call statistics 614 and message statistics 616 each contain instantaneous and total call quality results for the entry.

RTCP messages are continually collected and stored by the network analyzer 512 in the call list. As RTCP messages are collected, another process determines the instantaneous call quality for every call that is tracked by program code at five second intervals. Instantaneous call quality is based on the last message received for the particular call. Instantaneous call quality is defined as one of either GOOD, FAIR, POOR, or UNABLE TO CALCULATE.

Referring now to FIGS. 1A–1E, a flow diagram 100 of the preferred embodiment for reporting instantaneous call quality is illustrated. This process can be called by an operator for display or called for a process for reporting total call quality as described below. The process begins at the start step referenced by 102. When the 5-second interval has passed, the call list is collected 104 from the network analyzer 512. Calls in the call list are transitioned by use of a pointer, as known in creating databases. The call list is stored in a memory device such as memory storage on the network device or computer-readable medium.

At step 116, a pointer for the call list points to the first call in the call list for transitioning the call list. A pointer is a special type of memory variable that points to a memory address. In the preferred embodiment, the pointer points to calls in the call list. Next, it is determined whether the call is in a silence mode 118. The silence mode occurs when one end of a call is still connected while no longer sending voice messages. During silence mode, instantaneous call quality cannot be determined. If the current call is in the silence mode, the pointer moves to the next call 120. Steps 118 and 120 are repeated until a call is found that is not in the silence mode.

When the process 100 is in step 118 and it is determined that the call is not in silence mode, the next step is referenced by 122. At step 122, it is determined whether the call is active. If the call is not active, then the next step is step 120 since quality should not be calculated for an inactive call. If the call is active, the packet loss is converted to something usable 124. Packet loss must be converted to a format that is compatible with this instantaneous call quality determination. The converted value is determined by changing the packet loss value provided in the RTCP field into a percent. This percentage is calculated by multiplying this packet loss value by 100/256.

Instantaneous call quality is determined by threshold values set for each of jitter, packet loss, and delay. These threshold values set the minimum values for the quality metrics. The call quality of the call is set to GOOD at step 126 for default. Next, the basic thresholds are set to the default values 128. In the preferred embodiment, packet loss default value is set to zero (0) percent for POOR and GOOD quality. Delay is set to zero (0) milliseconds for POOR and GOOD quality. Jitter is set to zero (0) milliseconds for POOR and GOOD quality. The thresholds are then set to any thresholds that have been defined by the operator 130. The operator can set the largest amount of packet loss before the call is considered POOR or FAIR. Additionally, the operator can set the largest amount of jitter before the call is considered POOR or FAIR. Furthermore, the operator can set the largest amount of delay before the call is considered POOR or FAIR.

The payload type field contained in the RTP header determines payload. In step 132, it is determined whether the payload is video by examining the payload type field. If the payload is video, then the instantaneous quality is UNABLE TO CALCULATE 134. After step 134, the next step is step 162 (FIG. 1B) as described below. If the payload is not video, the next step is referenced by 136.

At step 136, it is determined whether the packet loss quality is POOR based upon whether the message's quality metric for packet loss is greater than or equal to the threshold value for POOR packet loss quality. This determination is performed by comparing the value of the call quality metric with the threshold value. As described below, other determinations are also made using a comparison of the call quality metric to an associated threshold for determining whether call quality is one of the call qualities for the time interval. If the packet loss is POOR, then the instantaneous quality is POOR for the interval and POOR call quality is returned 138. A POOR quality for any of the quality metrics means that the instantaneous quality is POOR. The next step after a return is step 162 as described below. If the packet loss is not POOR, then it is determined whether packet loss is FAIR 140. Packet loss is FAIR if the message's quality metric for packet loss is greater than or equal to the threshold value for FAIR packet loss quality. If it is determined that the packet loss is FAIR, the next step is 142. At step 142, the instantaneous call quality is set to FAIR. This is a temporary setting because it may determined later in the process that the instantaneous quality is different. After step 142, the next step is 144. If it is determined that the packet loss is not FAIR, the next step is 144.

At step 144, it is determined whether jitter quality is POOR based upon whether the message's quality metric for jitter is greater than or equal to the threshold value for POOR jitter quality. If the jitter is POOR, then the instantaneous quality is POOR for the interval and POOR call quality is returned 146. The next step after a return is step 162 as described below. If the jitter is not POOR, then it is determined whether jitter is FAIR 148. Jitter is FAIR if the message's quality metric for jitter is greater than or equal to the threshold value for FAIR jitter quality. If it is determined that the jitter is FAIR, the next step is 150. At step 150, the instantaneous call quality is set to FAIR. After step 150, the next step is 152. If it is determined that the jitter is not FAIR, the next step is 152.

At step 152, it is determined whether delay quality is POOR based upon whether the message's quality metric for delay is greater than or equal to the threshold value for POOR delay quality. If the delay is POOR, then the instantaneous quality is POOR for the interval and POOR call quality is returned 154. The next step after a return is step 162 as described below. If the delay is not POOR, then it is determined whether delay is FAIR 156. Delay is FAIR if the message's quality metric for delay is greater than or equal to the threshold value for FAIR delay quality. If it is determined that the delay is FAIR, the next step is 158. At step 158, the instantaneous call quality is set to FAIR. After step 158, the next step is 160. If it is determined that the delay is not FAIR, the next step is 160.

Step 160 returns the current set call quality, which may be either GOOD, FAIR, or POOR. There are GOOD, FAIR, POOR, and UNABLE TO CALCULATE call quality counters associated with each call. Next at step 162, the call quality counter for the current call is incremented 162.

Next, it is determined whether there are more calls in the call list 164. If so, the pointer goes to the next call in the call list 166. If there are not more calls in the call list, the process stops 168. Now, the instantaneous call quality has been determined for all of the calls in the 5-second time interval.

Figure 1A:
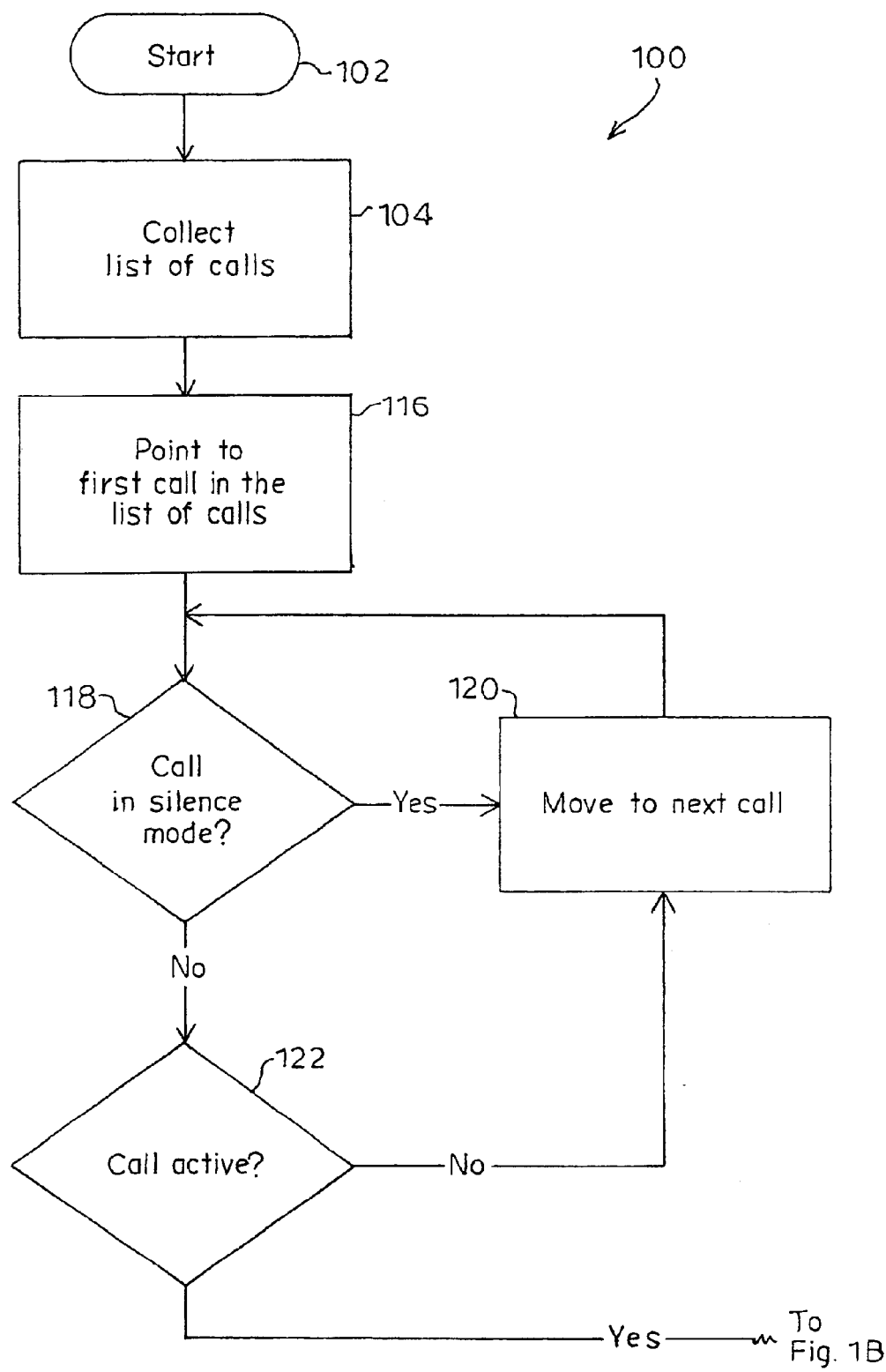
FIGS. 1A through 1E illustrate a flow diagram of the preferred embodiment for determining instantaneous call quality.
Figure 1B:
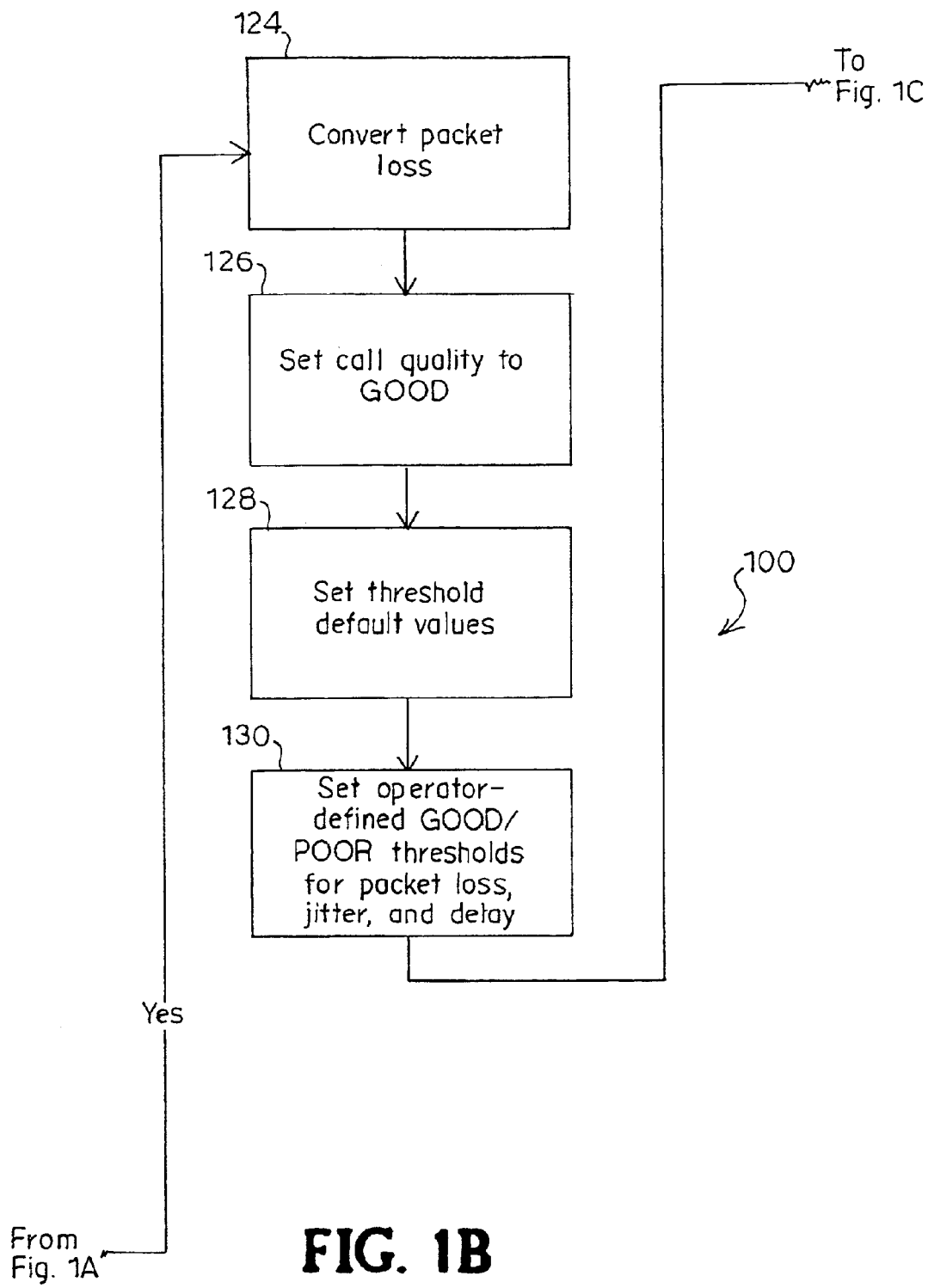
Figure 1C:
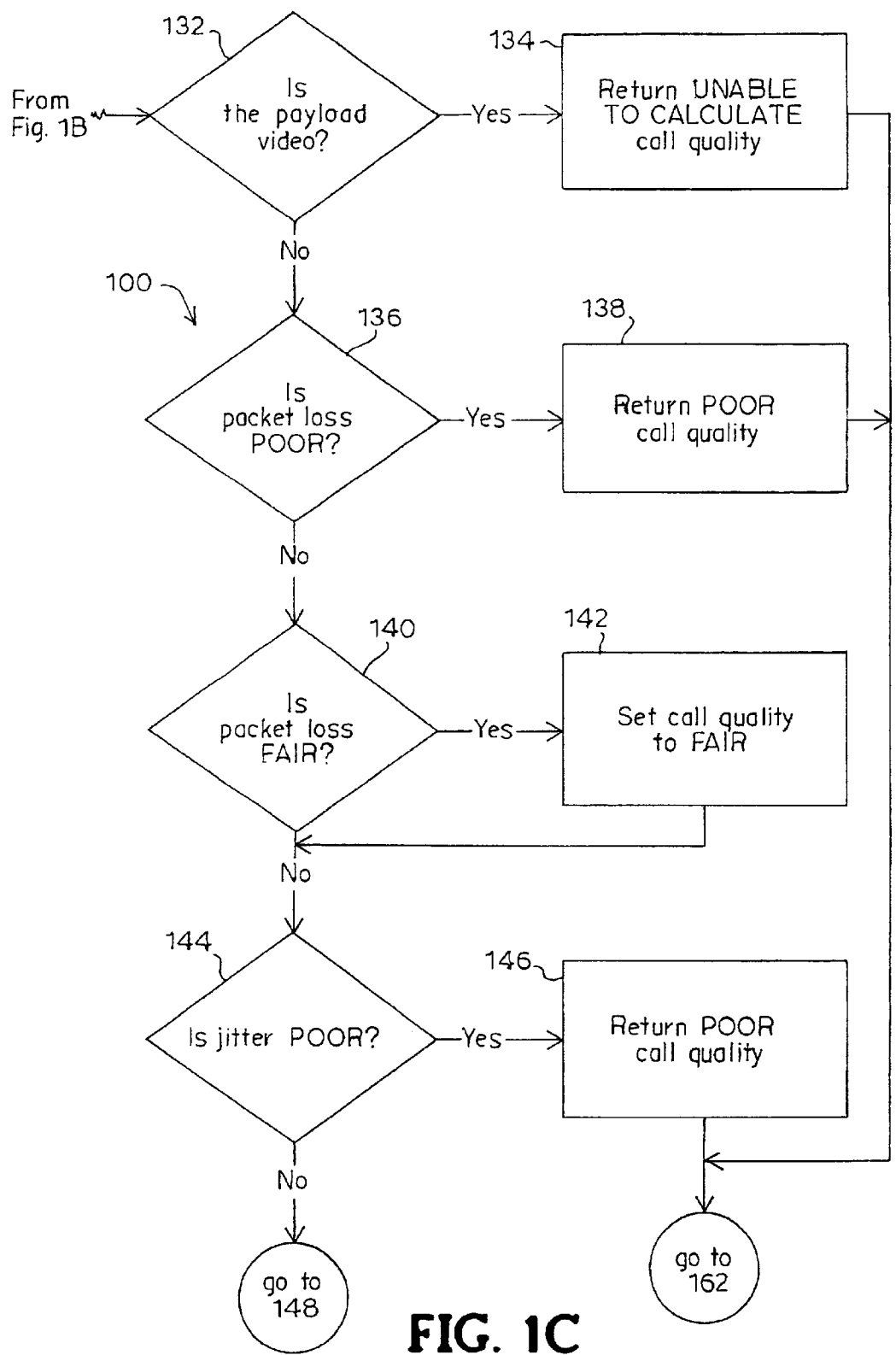
Figure 1D:
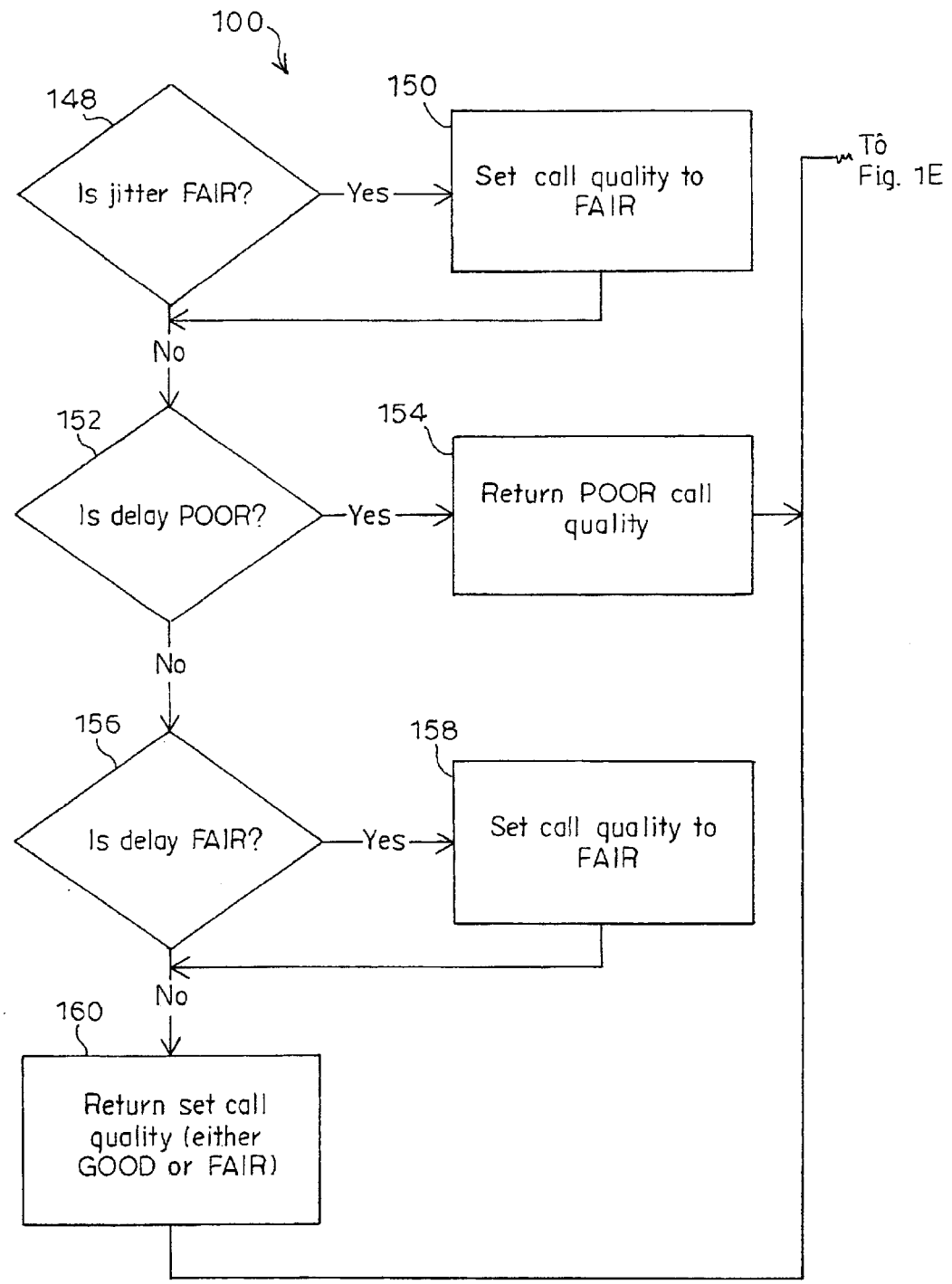
Figure 1E:
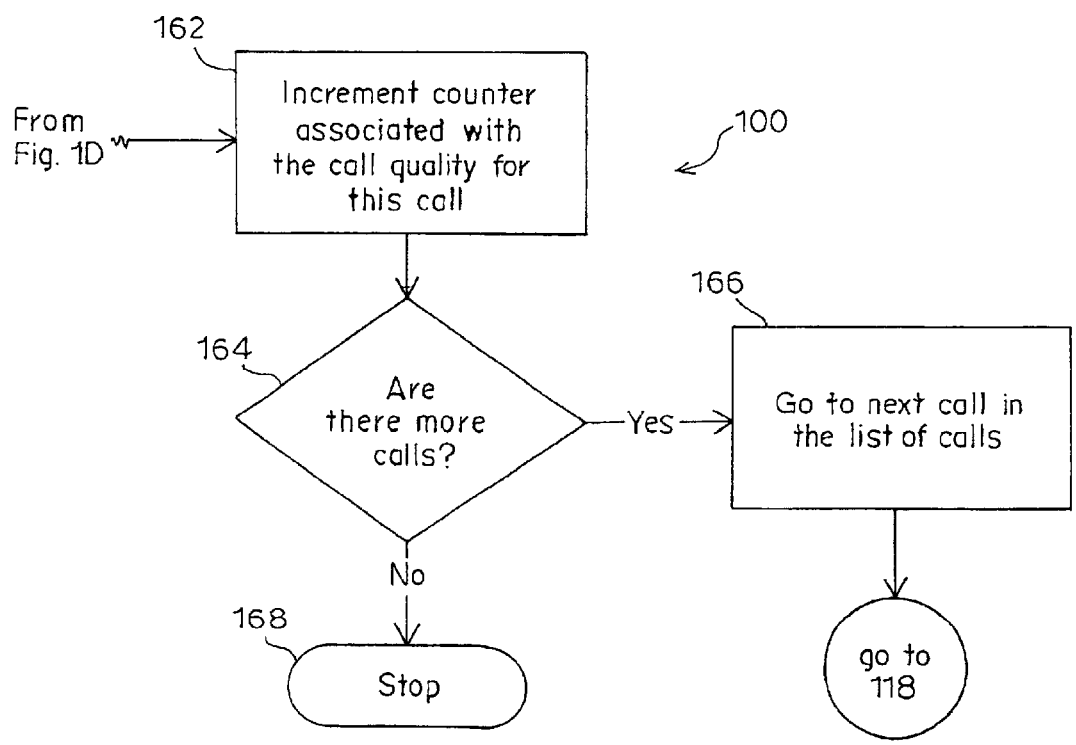
Figure 2A:
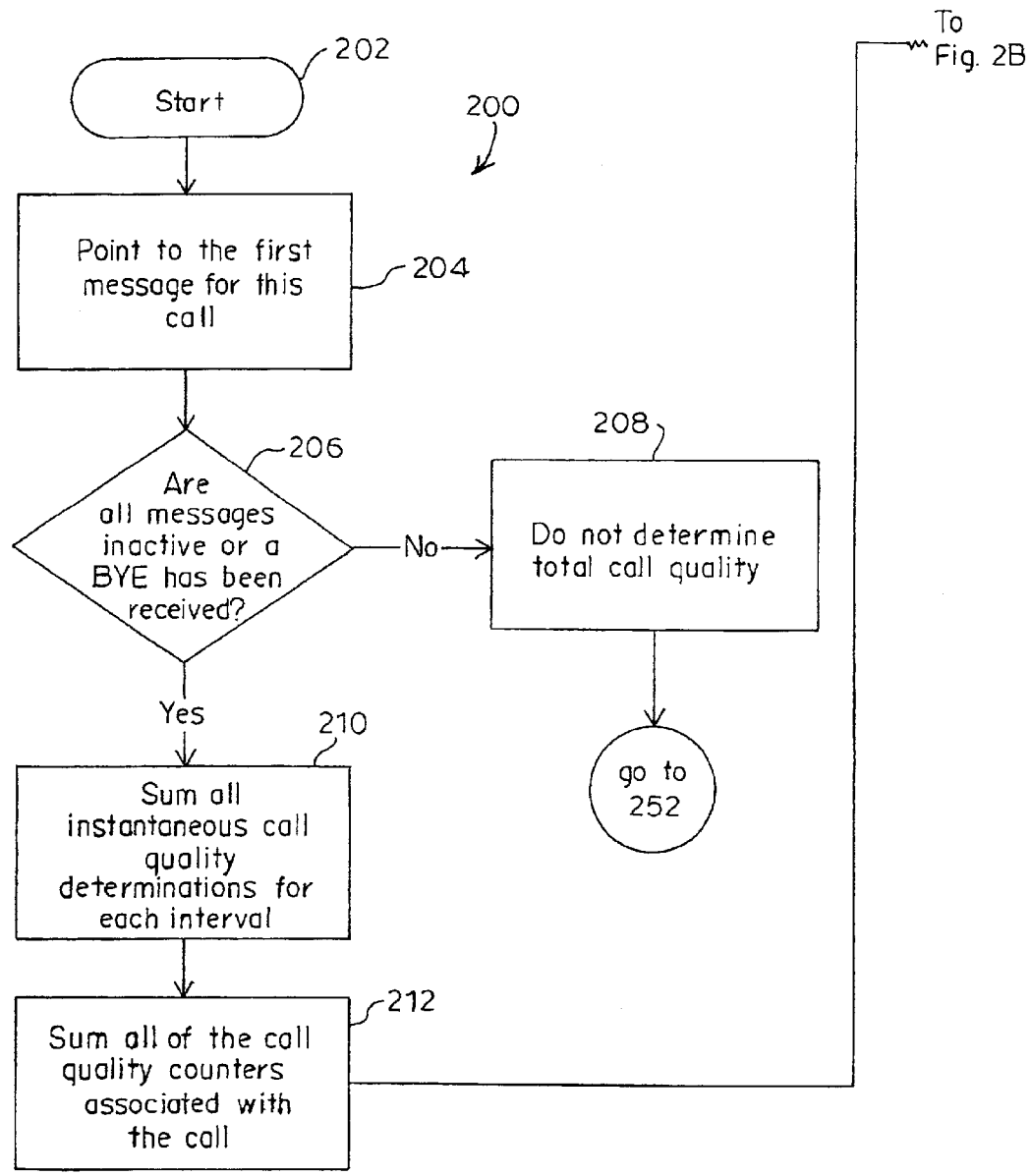
FIGS. 2A through 2C illustrate a flow diagram of the preferred embodiment for determining the total call quality.
Figure 2B:
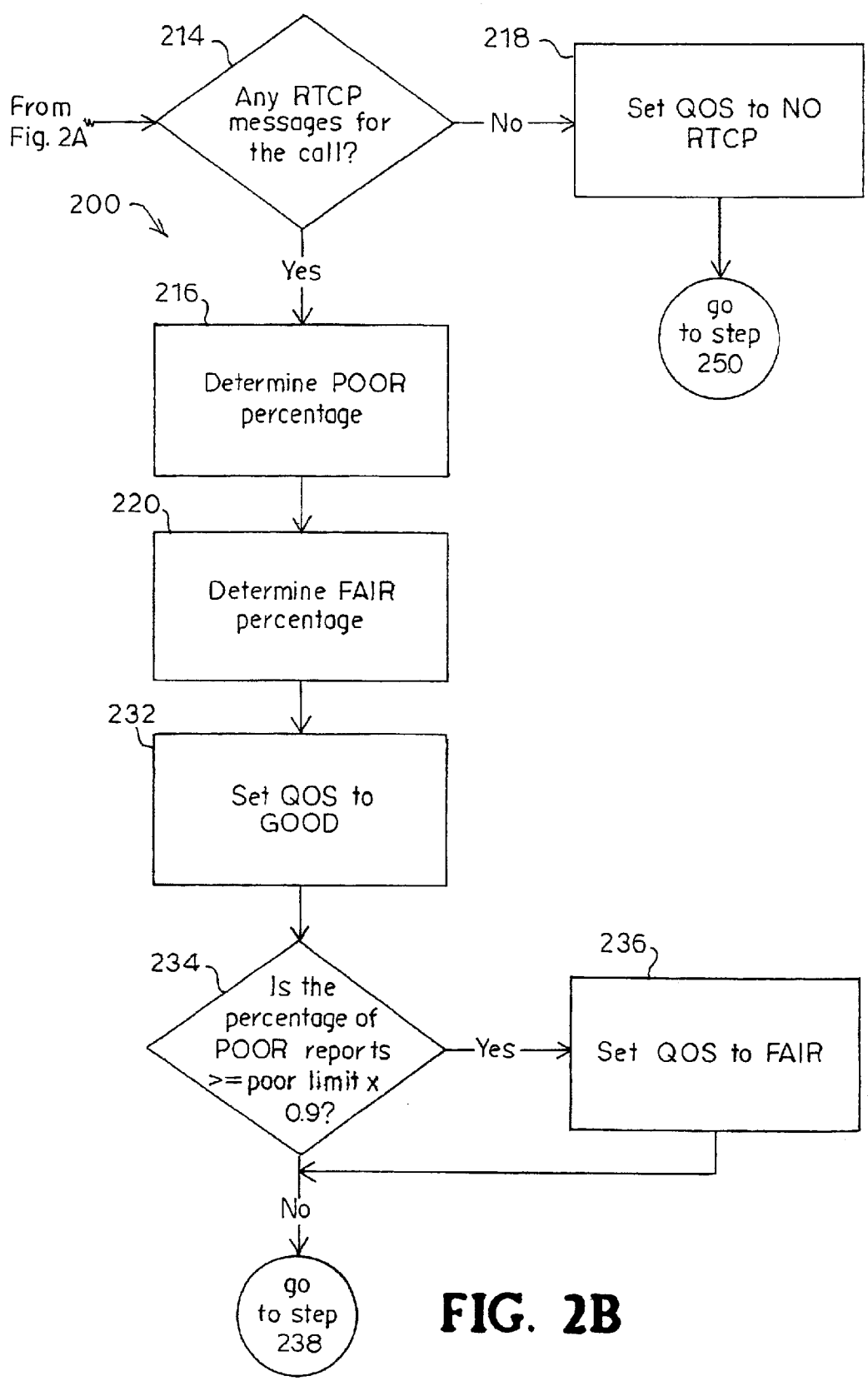
Figure 2C:
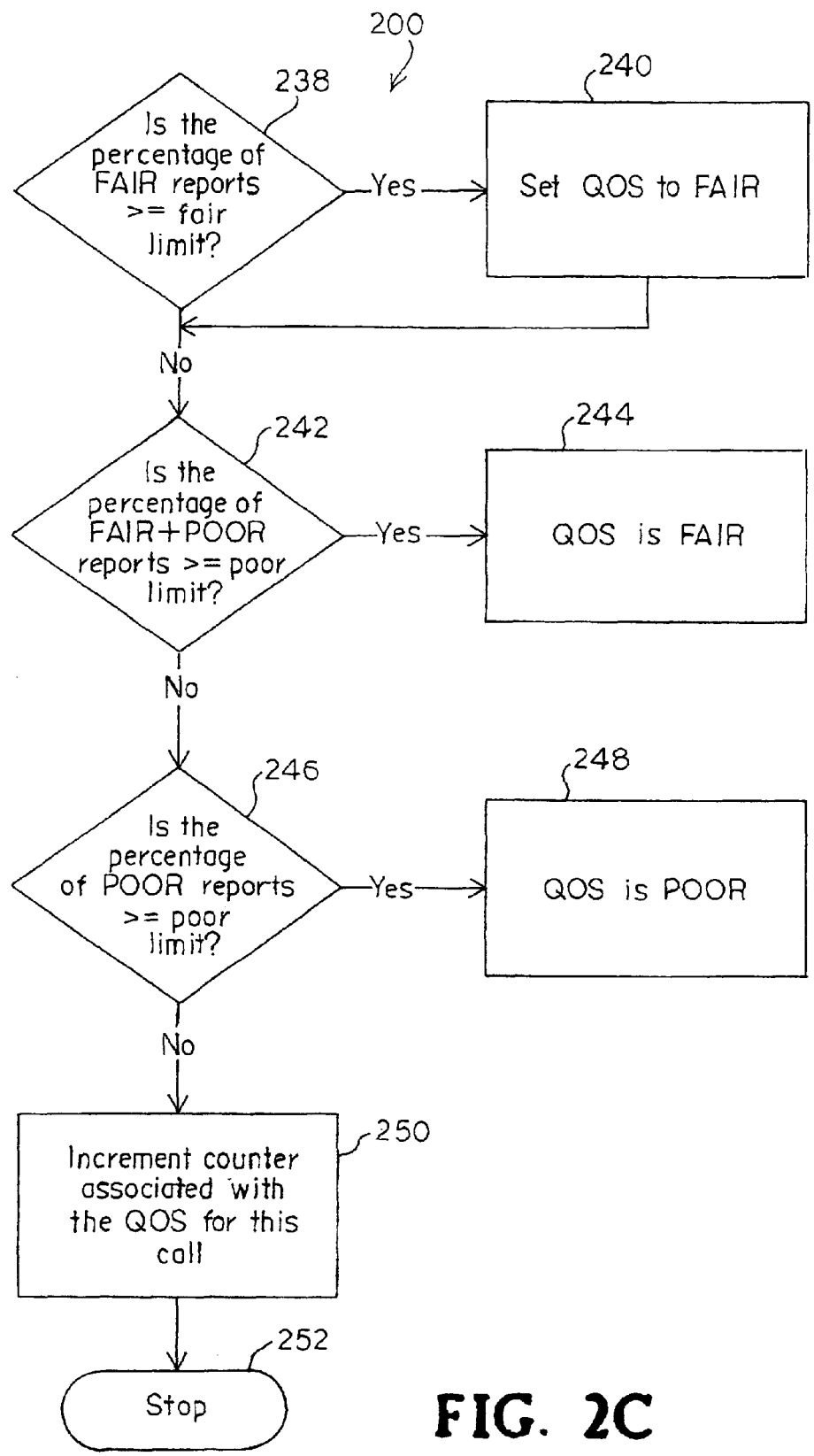

Referring now to FIGS. 2A–2C, a flow diagram 200 of the preferred embodiment for determining the total quality of a call is illustrated. The process starts at step 202. Next, a pointer for the call list points to the first message for the call 204. The messages for the call are transitioned to determine whether all the messages are inactive 206. If all messages for the call are not inactive or a BYE is received, then the call quality will not be determined 208. Otherwise, the next step is step 210.

In step 210, the instantaneous call quality determinations are summed for each interval for which instantaneous call quality has been determined for the call. Next, the total number of determinations for this call is determined by summing all of the call quality counters associated with this call 212 as described above. In this embodiment, the quality of the total call is based upon the instantaneous call quality determinations for the call and the total number of those determinations.

At step 214, it is determine whether there are any RTCP messages for the call. If there are no RTCP messages, the QOS is set to NO RTCP 218. QOS is a variable used for determining the total call quality. The next step is step 250. If there are RTCP messages for this call, the percentage of POOR reports is determined by dividing the number of POOR determinations for the call by the number of total determinations for the call 216. Similarly at step 218, the percentage of FAIR reports is determined by dividing the number of FAIR determinations for the call by the number of total determinations for the call.

At step 232, QOS, or total call quality, is set to GOOD. QOS will remain at this setting and total call quality will be determined to be GOOD unless it is otherwise changed.

Next, it is determined whether the percentage of POOR reports is greater than or equal to the poor limit multiplied by 0.9 at step 234. If not, the next step is 238. Otherwise, QOS is set to FAIR quality 236 and then the next step is 238. Poor limit and fair limit are quality limits which are operator-defined percentages for categorizing the total quality of a call. The operator may change these to any value that will be helpful. The default of these values are 30 percent each. For example, in default, if the operator does not specify a value, if the percentage of poor calculations is greater than or equal to 30 percent then the call quality is POOR. This is the same for a fair determination, except that if the call matches both the fair and poor percentage criteria, the POOR quality is reported.

At step 238, it is determined whether the percentage of FAIR reports is greater than or equal to the fair limit. If not, the next step is 242. Otherwise, QOS is set to FAIR 240 and the next step is 242.

At step 242, it is determined whether the percentage of FAIR plus the percentage of POOR reports is greater than or equal to the poor limit. If not, the next step is 246. Otherwise, QOS is set to FAIR 244 and then the next step is 246.

At step 246, it is determined whether the percentage of POOR reports is greater than or equal to the poor limit. If not, the next step is 250. Otherwise, QOS is set to POOR 248 and then the next step is 250. At this point in the process, QOS contains the total call quality determination.

Counters are kept to keep a history of the quality of calls. At step 250, the counter is incremented for the quality to which the QOS is set. The process stops at step 252. This data may also be presented to an operator in graphical or text form on the display 308 or by another computer device for presenting reports to an operator such as a printer.

While a preferred form of the invention has been shown in the drawings and described, since variations in the preferred form will be apparent to those skilled in the art, the invention should not be construed as limited to the specific form shown and described, but instead is as set forth in the following claims.

What is claimed is:

1. A method of reporting call quality for a call on a network, comprising:

receiving messages associated with the call, the messages including a set of call quality metrics;

comparing at least one of the set of call quality metrics to at least one of a set of associated thresholds, at intervals of time, for determining whether call quality is one of a set of call qualities for the designated time interval; and determining at least one percentage of at least one call quality from the set of call qualities received for all of the time intervals for the call.

2. The method of claim 1 wherein the step of receiving messages includes storing at least one quality metric of each message into an associated entry in a call list, the call list including at least one set of entries, each set of entries associated with a call.

3. The method of claim 1 or 2 wherein the set of call quality metrics include delay, jitter, and packet loss.

4. The method of claim 1 wherein each call quality metric is associated with a threshold for determining whether call quality is one of the set of call qualities.

5. The method of claim 1, 2, or 4 wherein the set of call qualities includes good, fair, and poor.

6. The method of claim 1 further comprising the step of displaying the at least one percentage to an operator.

7. The method of claim 1 further comprising the step of displaying the call quality for a designated time interval.

8. The method of claim 1 further comprising the steps of:

determining if the payload is video; and if the payload is video, the call quality for the time interval is not calculated.

9. The method of claim 1 further comprising the step of determining whether the at least one percentage of at least one call quality is greater than or equal to a quality limit for categorizing.

10. A method of reporting call quality for a call on a network, comprising:

receiving messages associated with the call, the messages including a set of call quality metrics;

storing at least one quality metric of each message into an associated entry in a call list, the call list including at least one set of entries, each set of entries associated with a call;

comparing at least one of the set of call quality metrics to at least one of a set of associated thresholds, at intervals of time, for determining whether call quality is one of a set of call qualities for the designated time interval;

determining at least one percentage of at least one call quality from the set of call qualities received for all of the time intervals for the call; and displaying the at least one percentage to an operator.

11. The method of claim 10 wherein the set of call quality metrics include delay, jitter, and packet loss.

12. The method of claim 10 or 11 further comprising the step of displaying the call quality for a designated time interval.

13. The method of claim 10 or 11 further comprising the step of determining whether the at least one percentage of at least one call quality is greater than or equal to a quality limit for categorizing.

14. A computer program product for enabling a computer system to report call quality for a call on a network, the computer program product including a computer program comprising:

instructions for receiving messages associated with the call, the messages including a set of call quality metrics;

instructions for comparing at least one of the set of call quality metrics to at least one of a set of associated thresholds, at intervals of time, for determining whether call quality is one of a set of call qualities for the designated time interval; and instructions for determining at least one percentage of at least one call quality from the set of call qualities received for all of the time intervals for the call.

15. The computer program product of claim 14 wherein the computer program further comprises instructions for storing at least one quality metric of each message into an associated entry in a call list, the call list including at least one set of entries, each set of entries associated with a call.

16. The computer program product of claim 14 further comprising instructions for displaying the at least one percentage to an operator.

17. A computer program product for enabling a computer system to report call quality for a call on a network, the computer program product including a computer program comprising:

instructions for receiving messages associated with the call, the messages including a set of call quality metrics;

instructions for storing at least one quality metric of each message into an associated entry in a call list, the call list including at least one set of entries, each set of entries associated with a call;

instructions for comparing at least one of the set of call quality metrics to at least one of a set of associated thresholds, at intervals of time, for determining whether call quality is one of a set of call qualities for the designated time interval;

instructions for determining at least one percentage of at least one call quality from the set of call qualities received for all of the time intervals for the call; and instructions for displaying the at least one percentage to an operator.

18. Apparatus for reporting call quality for a call on a network, the apparatus comprising:

means for receiving messages associated with the call, the messages including a set of call quality metrics;

means for comparing at least one of the set of call quality metrics to at least one of a set of associated thresholds, at intervals of time, for determining whether call quality is one of a set of call qualities for the designated time interval; and means for determining at least one percentage of at least one call quality from the set of call qualities received for all of the time intervals for the call.

19. The apparatus of claim 18 further comprising means for storing at least one quality metric of each message into an associated entry in a call list, the call list including at least one set of entries, each set of entries associated with a call.

20. The apparatus of claim 18 further comprising means for displaying the at least one percentage to an operator.

21. Apparatus for reporting call quality for a call on a network, the apparatus comprising:

means for receiving messages associated with the call, the messages including a set of call quality metrics;

means for storing at least one quality metric of each message into an associated entry in a call list, the call list including at least one set of entries, each set of entries associated with a call;

means for comparing at least one of the set of call quality metrics to at least one of a set of associated thresholds, at intervals of time, for determining whether call quality is one of a set of call qualities for the designated time interval;

means for determining at least one percentage of at least one call quality from the set of call qualities received for all of the time intervals for the call; and means for displaying the at least one percentage to an operator.

22. A computer system operable to report call quality for a call on a network by performing the steps of:

receiving messages associated with the call, the messages including a set of call quality metrics;

storing at least one quality metric of each message into an associated entry in a call list, the call list including at least one set of entries, each set of entries associated with a call;

comparing at least one of the set of call quality metrics to at least one of a set of associated thresholds, at intervals of time, for determining whether call quality is one of a set of call qualities for the designated time interval;

determining at least one percentage of at least one call quality from the set of call qualities received for all of the time intervals for the call; and displaying the at least one percentage to an operator.

23. A computer readable memory system encoded with a call list, each entry in the call list comprising at least one call quality metric from an associated message.

24. The computer readable memory system of claim 23 wherein each entry in the call list includes a call number for identifying an associated call from among a set of calls.

* * * * *